United States Patent
Obaidi

(10) Patent No.: US 11,308,339 B2
(45) Date of Patent: Apr. 19, 2022

(54) METHODS AND SYSTEMS FOR IDENTIFYING AND PROFILING BIOLOGICAL TISSUE

(71) Applicant: T-Mobile USA, Inc., Bellevue, WA (US)

(72) Inventor: Ahmad Arash Obaidi, San Ramon, CA (US)

(73) Assignee: T-Mobile USA, Inc., Bellevue, WA (US)

( * ) Notice: Subject to any disclaimer, the term of this patent is extended or adjusted under 35 U.S.C. 154(b) by 184 days.

(21) Appl. No.: 15/883,556

(22) Filed: Jan. 30, 2018

(65) Prior Publication Data
US 2019/0236389 A1 Aug. 1, 2019

(51) Int. Cl.
*G06K 9/00* (2006.01)
*G06K 9/62* (2022.01)

(52) U.S. Cl.
CPC ..... *G06K 9/00892* (2013.01); *G06K 9/00362* (2013.01); *G06K 9/00617* (2013.01); *G06K 9/6202* (2013.01)

(58) Field of Classification Search
CPC .......... G06K 9/00892; G06K 9/00362; G06K 9/00617; G06K 9/6202
USPC .......................................................... 382/116
See application file for complete search history.

(56) References Cited

U.S. PATENT DOCUMENTS

| | | | | |
|---|---|---|---|---|
| 2008/0075334 A1* | 3/2008 | Determan | .......... | G06K 9/00255 382/117 |
| 2009/0074263 A1* | 3/2009 | Higuchi | .............. | G06K 9/00026 382/126 |
| 2010/0299530 A1* | 11/2010 | Bell | ........................ | G06F 21/32 713/186 |
| 2013/0063582 A1* | 3/2013 | Choi | .................. | G06K 9/00617 348/78 |
| 2014/0380446 A1* | 12/2014 | Niu | ..................... | H04L 63/0861 726/7 |

(Continued)

OTHER PUBLICATIONS

Changseok Choi. "Age change for predicting future faces." FUZZ-IEEE'99. 1999 IEEE International Fuzzy Systems. Conference Proceedings (Cat. No. 99CH36315). vol. 3. IEEE, 1999 (Year: 1999).*

(Continued)

*Primary Examiner* — Andrew M Moyer
(74) *Attorney, Agent, or Firm* — Lee & Hayes, P.C.

(57) ABSTRACT

Biological organs and tissues can be identified using imaging or other data representing the organs and tissues. Example imaging modalities include 3D x-rays (including CT scans), MRI imaging, and millimeter wavelength scanning commonly used for airport security. Biomarkers may be identified as part of daily activities, such as airport travel, applying for government identifications (licenses and passports), medical appointments, and fitness monitoring. These imaging approaches may create static and dynamic data sets for comparison against existing data sets in a database. Biomarkers may identify (and predict) normal, morphological or morbidity changes over time. Such imaging biomarkers may securely identify individuals at critical checkpoints such as airports and border crossings. This approach is also applicable to plant identification and can provide a secure chain of custody for virtually any object.

21 Claims, 6 Drawing Sheets

(56) References Cited

U.S. PATENT DOCUMENTS

| | | | | |
|---|---|---|---|---|
| 2015/0379255 | A1* | 12/2015 | Konanur | H04W 12/0602 |
| | | | | 726/19 |
| 2016/0328600 | A1* | 11/2016 | Che | G06K 9/2018 |
| 2017/0004295 | A1* | 1/2017 | Kim | G06F 21/32 |
| 2017/0004369 | A1* | 1/2017 | Kim | G06K 9/6255 |
| 2017/0103230 | A1* | 4/2017 | O'Brien | G06F 16/93 |
| 2019/0011534 | A1* | 1/2019 | Trotta | G01S 13/867 |
| 2019/0282086 | A1* | 9/2019 | Cohen | A61B 3/112 |

OTHER PUBLICATIONS

Qin, Huafeng, and Mounim A. El-Yacoubi. "Deep representation-based feature extraction and recovering for finger-vein verification." IEEE Transactions on Information Forensics and Security 12.8 (2017): 1816-1829. (Year: 2017).*

* cited by examiner

METHODS AND SYSTEMS FOR IDENTIFYING AND PROFILING BIOLOGICAL TISSUE

BACKGROUND

Scanning and other data collection devices are ubiquitous today. For example, scanners in airports can be used for identifying contraband and other items prohibited from entering an aircraft. In another example, medical providers, including physicians, laboratories, urgent care clinics, and hospitals, provide diagnostic imaging and laboratory tests for their patients. Additionally, individuals wear devices (wearables) for continual monitoring of certain biometric markers such as heart rate or glucose control. Each of these imaging modalities and data collection devices may collect static or dynamic data associated with an individual or user.

BRIEF DESCRIPTION OF THE DRAWINGS

The detailed description is set forth with reference to the accompanying figures, in which the left-most digit of a reference number identifies the figure in which the referenced number first appears. The use of the same reference numbers in different figures indicates similar or identical items or features.

DETAILED DESCRIPTION

Figure 1:
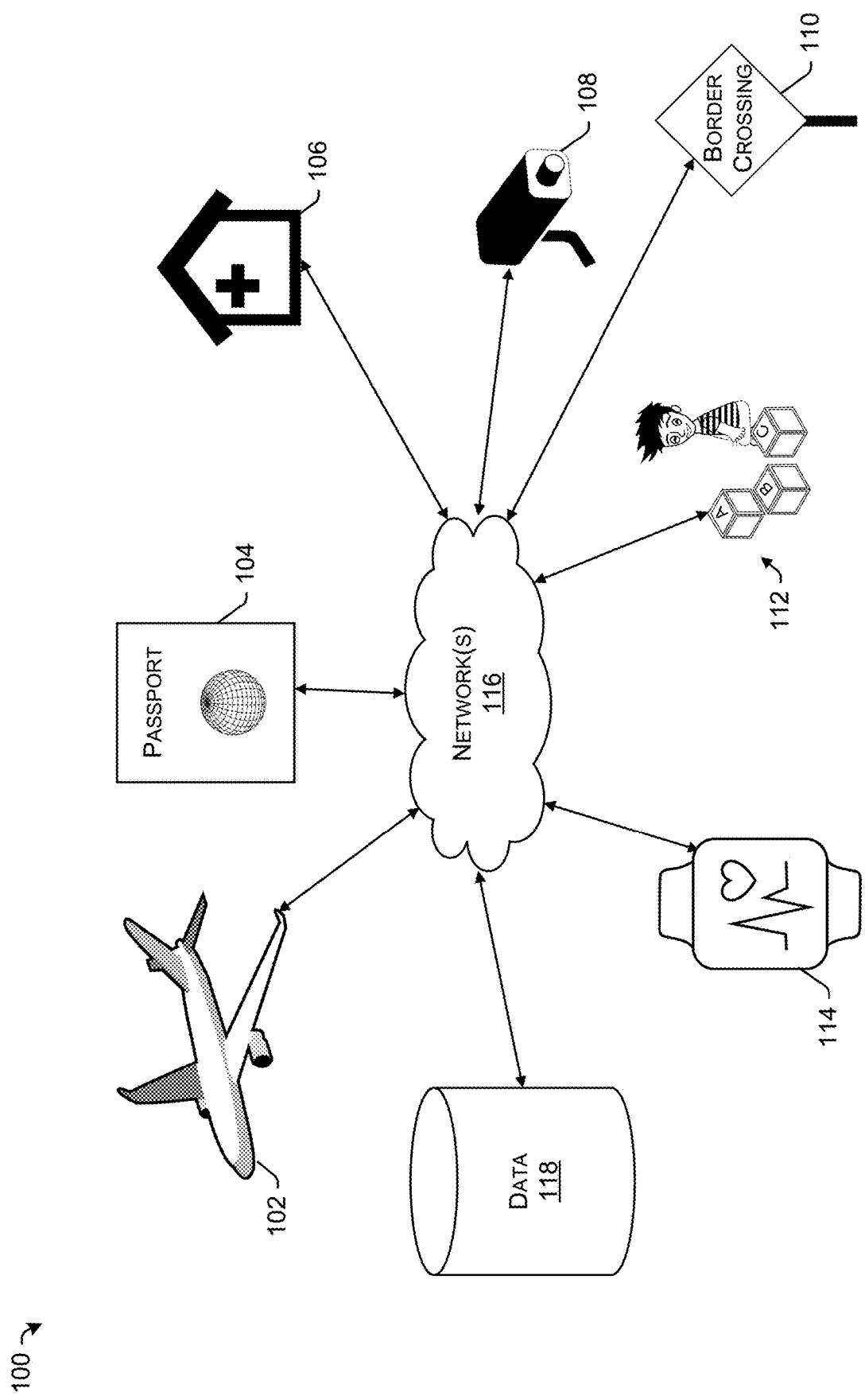
FIG. 1 is an example environment illustrating various checkpoints in which images, biometric markers, and individual signatures may be collected and provided to a database.

This disclosure describes techniques and arrangements for identifying subjects or biological objects for security purposes, for example. The methods and systems may be applied for the identification of human beings and other subjects, animals, plants, and inanimate objects. The techniques and arrangements may be used to authenticate and authorize individuals for access to highly sensitive areas.

The disclosed systems and methods capture image data at one or more locations and provide the image data to one or more databases for storage as a library of images. The stored image data may be compared with later-acquired images for a robust identification of images. The systems and methods are applicable for identification of people and other animals, plants, and inanimate objects. In some examples, the images may be time-stamped, providing for machine-learning estimations of expected physiological and/or morphological changes. In some examples, the machine learning estimation may predict morphological changes based on underlying diseases and other ailments. Morphological changes may include changes in structure, physiology, biochemistry, or metabolism. By comparing recently captured images with previously captured images, in light of optional adjustments for expected physiological, morphological, metabolic, morbidity, and other biological changes, the disclosed systems and methods may provide a more robust identification of biological objects.

One example system for identification of a subject includes an imaging apparatus coupled to a network. The imaging apparatus may generate images of a subject. The system also includes a database coupled to the network. The database stores a library of images of known subjects. The system also includes a computer coupled to the network. The computer may be programed to collect an image of the subject via the imaging apparatus. The collected images of the subject may be compared with at least a portion of the images in the library of images. Based on the comparison, the identity of the subject may be determined. The collected images may be transmitted to the database for storage and updating the database.

In other examples, an indication of the reliability of noisy image data may be stored in the database. Such an indication may be used to account for images that provide some information content in the presence of noisy data. For example, some collected images may be less noisy than other images. Noise associated with the image may be estimated and provided as a feature to the database. Some sources of noise may include the image acquisition device. Other noise sources may include noise associated with aligning the subject and capturing the image. The inclusion of a noise parameter may further enhance the subject identification.

The disclosed systems and methods may include capturing and transmitted images to be stored in a database. It is noted that the disclosed systems and methods need not capture images, but may operate on previously captured images. The database may be architected using various structures, including a distributed database, a centralized database, an image database, and an XML database, among others. The image data may be encrypted in some examples to preserve the privacy of the data. In other examples, the blockchain technology may serve as a distributed database and as an encryption methodology for maintaining data privacy. The database may be updated as additional images are collected, which may provide additional robustness for identification.

The systems and methods may identify images from a subject of unknown identity or origin. In one example, collected images may be compared against images stored in the library of images in the database to identify the collected images. A collected image may be compared against a subset of characterized images stored in a database. The collected image may be identified based, at least in part, on the comparison with the images in the database. In one example, the collected image may be compared against a known set of images in the database. In another example, the collected image may be compared against the entirety, or a subset, of the images in the database. The entire images may be compared, or in other examples, a subset of the library of images or features of the images may be compared to identity the subject of the image.

A collected image may be optionally processed before the image is transferred to the database. In an example, attributes of the image may be identified and transferred to the database. Example attributes may include expected features of an image, such as known relative three-dimensional topographies or structures, or features than may be identified in a vector space. In other examples, anomalies such as morphological or other changes consistent with aberrant tissues or conditions may be transferred and stored in the database. These unexpected changes provide additional signature data for uniquely identifying a subject image. In an example, the image, a processed version of the image, attributes of the image, and combinations thereof may be stored in the database.

Identification of a subject may be quantified by a confidence metric or acceptable threshold. The identification process may determine an error or deviation between the collected and stored images. In one example, if the error or deviation is within an acceptable threshold for identification between the collected and stored images, the identification may be made with acceptable confidence that the identification is correct. Increasing the acceptable threshold for identification so that more error or deviation may be tolerated, may increase the false positive identification error rate, possibly increasing the probability of erroneous identification. On the other hand, reducing the acceptable threshold for identification may reduce the probability of a false identification but may result in the inability of identifying the subject if the error is not sufficiently attenuated.

Image analysis may be performed using artificial intelligence or machine learning approaches such as deep neural networks or statistical estimators. In one example, a deep neural network may be trained using training data, and thereafter, the trained neural network may be applied to the collected image to generate a classification of the image. The training data may be sourced from the database or from another data source. The training data may include images sufficient to train the neural network to identify and/or predict changes in the images over time. The neural network may be trained using a supervised or unsupervised learning algorithm.

Images stored in the database may be adjusted to account for expected changes to occur in the images over time. Some disease states or other morphological changes may exhibit a predictable or expected change over time. In other examples, the system may estimate changes based on expected aging of the subject. In still other examples, changes associated with a diseased state of a subject may be evaluated to provide an enhanced, robust identification method. This prediction may account for expected changes in images to more accurately determine the identity of the subject.

In one example, the timestamp of the collected image may be used to adjust images stored in the database. Thereafter, the collected image may be compared against the adjusted images to enhance the analysis. In other examples, changes predicted to occur over time to an image are generated and compared against the collected image. In this fashion, expected morphological changes, such as changes in bone structure or arterial and venous systems, may be included in the images for a more complete comparison against the collected image.

In one example, the collected images are compared against images (or adjusted images) in a database to identify the subject of the image. In one example, the systems and methods may identify a person. In another example, the systems and methods may identify an animal. In another example, the systems and methods may identify plants or objects other than animals. It is understood that the disclosure applies to identification of any object, and is not limited to the identification of biological objects.

Maintaining data privacy is another aspect of the disclosed systems and methods. Data privacy may be maintained during image collection by encrypting the image data (or features or attributes of the image data). Image data may be encrypted during or after collection by an image collection apparatus or device. Collected image data may also be encrypted before, during, or after processing by a computer. Encrypted collected image data may be transferred to the database to minimize the likelihood that the information may be accessed by an unauthorized party. Images received for storage in a library of images in a database may be stored in the database in an encrypted data format. Blockchain technology may be securely stored in a distributed database, reducing the possibility that data privacy breach, while maintaining data integrity. Blockchain may provide redundancy, allowing access of encrypted data even as database resources are may be removed or offline. The disclosed systems and methods may provide a secure approach for collecting and classifying individual-specific data.

Biological organs and tissues can often be uniquely identified using three-dimensional imaging. Example imaging modalities include three-dimensional x-rays (including computed tomography (CT) scans), magnetic resonance imaging (MRI) systems, and millimeter wavelength scanning commonly used for airport security. Biomarkers may be identified as part of daily activities, such as airport travel, applying for government identifications (e.g., licenses and passports), medical appointments, and fitness monitoring. The aforementioned imaging modalities may create static and/or dynamic images for comparison against existing, known images registered in a universal database. Unique biomarkers and images may identify (and predict) normal, morphological or morbidity changes over time. Such biomarkers and images may securely identify individuals at critical checkpoints such as airports and border crossings. This approach is also applicable to plant identification and can provide a secure chain of custody for virtually any object.

Biological objects may be uniquely identified through three-dimensional imaging and/or biometric data collection. In one example, the systems and methods of this disclosure use three-dimensional scanning such as x-ray, MRI, and CT Scanning, among others, to uniquely identify those humans (or other animals) for authentication and authorization to access or use certain highly sensitive services. Other image systems may also be used such as two-dimensional or time varying three-dimensional images.

In one example, one or more three-dimensional image profiles and/or biometric data may be used to identify persons. In this case, a three-dimensional image profile of a person is generated (such as a three-dimensional structure of a person's bones, arteries, veins, ear, or retina, among others) and compared to images registered in a universal database. A match (to an appropriate threshold or confidence value) between collected data and data previously collected, stored, and registered may be used to uniquely identify an unknown sample or subject based on known samples. In this fashion, a person's identity may be confirmed based on previously collected data.

Identification may be based on features of individual images. For example, hard tissues such as bone or teeth structure may be measured by x-ray technology. Furthermore, various features of an individual's eyes may be used as a metric for identification. For example, the three-dimensional structure of a person's eye socket or a scan of a person's iris, lens, or retina may identify, or at least be correlated to an individual. Additionally, the structure of a person's ear, the structure or layout of a person's arterial and venous systems, the curvature of a person's spine, the dynamics of a person's gait, and combinations of any of the above, including any of the structural, functional, or biometric data associated with a person may be used for identification. Example biometric data that may facilitate human identification include heart rate, electrocardiograms, encephalograms, heart conduction propagation, abnormal cardiac rhythms, laboratory tests, including blood tests, and glucose monitoring, among others.

Features of the collected image may be extracted and compared against similar features in the database. In one example, should the comparison reach an acceptable threshold the subject under test may be identified based on the identified images in the database. In other examples, combinations of images of an individual may be collectively analyzed to enhance the predictability of the methods and systems. For example, images of bone structure, combined with arterial and venous structure may be compared against similar image types stored in the database. A sufficient match between these various image modalities may enhance the predictive nature of the inventions and systems and may lead to a more accurate identification.

The disclosed methods and systems may be used in numerous locations besides airport checkpoints. Other example locations include physician and other medical provider locations, highly secure locations for manufacturing and development, and secure entry applications. Another point of contact may be the location where a person obtains their motor vehicle license. States typically require an eye examination to obtain a driver's license. When a person obtains a passport, the person may be required to undertake additional imaging tests to verify that the person matches the identity of the passport. In daycare or other childcare settings, correctly identifying people is of paramount importance to prevent strangers or non-approved people to pick up a child at a care center. In these settings, an identification modality such as eye or bone scans may be used to confirm a person's identity so that a child is not given custody to an unapproved person.

In some examples, the imaging modalities may include retinal, iris, and fingerprint scanning. Each of the imaging modalities may be adapted for use in a smart phone. The imaging modalities may also be applied to fitness trackers and other wearable devices providing real-time biometric measurements such as heart rate and glucose monitoring. These approaches may also be applied to sleep dynamics providing another unique signature for identification purposes.

In other examples, the disclosed methods and systems may be applied to identification of any animal or plant. In still other examples, the disclosed methods and systems may be applied to manufacturing testing and product identification through unique structure signatures of the product or process under test.

In still other examples, the disclosed systems and methods may be applied to dynamic images or changes in multi-dimensional images. For example, metabolic processes unique to a person may be imaged and used as a unique signature for identification purposes. Example metabolic processes include baseline metabolism of an individual or metabolism of any external agent such as a drug or other type of marker. Combining dynamic images with static images may provide a more secure or robust identification process.

The techniques, apparatus, systems, and methods may be implemented in many ways. Example implementations are provided below with reference to the following figures.

An environment for implementing the systems and methods of this disclosure is shown in FIG. 1. This figure illustrates numerous potential sites for data collection for identification and confirmation. For example, data may be collected at an airport 102, government agencies 104, medical providers 106, public cameras 108, border checkpoints 110, daycare centers 112, and wearable devices 114. Each of these sites can be connected to a network such as the internet 116. Additionally, a database 118 can also be connected to the network 116.

The airport 102 may provide multiple sites for data collection. Security, preventing authorized access, and preventing certain items from entering an aircraft is important in airports. Airport security screening may involve image collecting devices using a subset of low energy, microwave radio frequency spectrum or millimeter wave scanning to perform whole body imaging of passengers. Millimeter wavelength radiation may provide a detailed three-dimensional scan or image of the surface of the subject's skin. A generic body outline of the subject may be displayed to alleviate privacy concerns in the public airport setting.

Another image collecting device that may be used in an airport to generate a whole-body image is a backscatter x-ray machine. The generated backscatter x-ray pattern of an object or subject is a function of the material property and may create a two-dimensional image of a subject. To address privacy concerns stemming from the high-resolution images, a backscatter x-ray collected image may be publicly displayed as a chalk outline of a person rather than photo-quality images.

Besides a millimeter wavelength and backscatter x-ray devices, a passenger may pass through a hard tissue scanner for collecting images of bone and other hard tissue structure. Current systems for scanning hard tissue include an x-ray or CT scanner. X-ray machines may provide detailed two-dimensional imaging or projectional radiography of body parts, including as hard or dense tissue such as bone, which absorb some of the x-ray photons. Soft tissues may be imaged by x-rays having a less penetrating x-ray beam than typically used to scan hard tissue. Computed tomography (also known as computed axial tomography, computed aided tomography, CAT, or CT) may generate a three-dimensional scan of a subject by acquiring numerous x-ray projections at different angles producing image slices across a scanned object. A computer algorithm reconstructs the two-dimensional slices into a three-dimensional image of the subject to generate a three-dimensional image of the dense tissue (e.g., bone) structure of a subject.

In another example, a soft tissue scanner such as a MRI or an ultrasound machine may obtain images of soft or hard tissue of a subject. Magnetic resonance imaging (MRI) uses high strength magnetic fields combined with an RF transmitter and field gradients to generate detailed three-dimensional images of body tissue. MRI imaging images locations of fat and water in body tissue. MRI technology can provide specific imaging of fat, slowly flowing blood, melanin, gray and white matter in the brain, water-based morbidity changes such as edema, tumor, infarction, inflammation, and infection. MRI imaging of hard and soft tissue may be enhanced by using contrast agents. MRI imaging may provide both static and dynamic three-dimensional images for identification purposes. MRI may also image hard tissue using a contrast agent. CT scanners may image soft tissue, typically with the use of a contrast agent.

Body tissue may be imaged using ultrasound technologies. Ultrasound imaging uses high frequency sound waves to generate images of muscles, tendons, and many internal organs. Ultrasound imaging can identify the size, structure, and morbidity of tissue and organs, and can generate both static and dynamic images.

Images or data collected by image collecting devices such as millimeter wavelength, x-ray backscatter, MRI, CT, ultrasound, and x-ray image collecting devices or apparatuses may be analyzed and sent to the database 118.

The government agencies 104 may also provide additional points for data collection. For example, a person applying for a driver's license can be given an iris scan or a retinal scan in additional to the traditional eye test. In another example, a person applying for a passport or social security card may be subject to imaging modalities for identification purposes. In this fashion, the person's identity may be confirmed without relying on a person's documents or representations. The methods and systems may be applied to other government agency functions such as applying for marriage licenses, paying taxes (federal, state, or local), or voting. The collected data may be analyzed and sent to database 118 via network 116 for identification purposes.

Identification data may also be obtained at a medical provider's site 106. In this case, results of imaging studies may be transmitted to the database 118 via the network 116. A subject may receive x-ray or CT images of hard tissue, or MRI images or ultrasound images. In another example, the results of lab tests or other medical tests may be forwarded to database 118 via network 116. The results of any medical test may be stored in database 118. Example sites for medical providers include a physician's office, a laboratory office, an emergency room, an urgent care clinic, or any other space in which a user receives medical care such as a telemedicine location. The collection of images associated with an individual may be registered in the database 118 for future identification purposes.

Many cameras (e.g., 108 in FIG. 1) exist in the public today. Some of these cameras take images at or near road intersections. Other cameras take security images outside buildings or other structures throughout the day. Some cameras are placed on top of buildings for surveillance purposes. Additionally, other cameras exist inside private or public buildings. Each of these cameras may take video of a person, including a person's walking gait. If the person whose gait is being measured is known, then the gait images along with the person's identification may be sent to database 118. Additionally, cameras may acquire infrared images, showing among others, a heat signature of a subject. These infrared images may be stored in database 118 via network 116 as an additional metric for personal identification.

Personal identification is an important issue at border checkpoints 110. In these locations, it is important to confirm the identity of a person and match it to their identification document for entry purposes. A country may have an enhanced need to identify every person who crosses its border and identify people who are not permitted to enter, or otherwise may present a danger to the public or specific individuals. Border checkpoints may use various imaging modalities to identify biometric markers. For example, images may be obtained using x-ray, CXT, MRI, or ultrasound equipment. These images may be analyzed and transferred to the database 118 via the network 116.

Another checkpoint for image identification is a daycare center 112. Daycare providers typically must confirm the identification of a person before allowing one of its children to leave. It is paramount that the daycare facility transfer control and custody of a child only to an authorized person. In this case, biometric markers may be obtained through x-ray or MRI imaging, among others. These images may be analyzed and transmitted to database 118 via network 116.

A further example for data collection is the data collected by wearable devices 114. Such devices include smart watches, GPS watches, heart rate monitors, and clothes with embedded sensors. Each of these devices may obtain data associated with an individual. For example, a person's heart rate, at rest or when stressed under exercise, may provide a unique signature. A person may also be monitoring her glucose level. These wearable devices may continuously transmit biomarker data to the database 118 for identification purposes.

Figure 2:
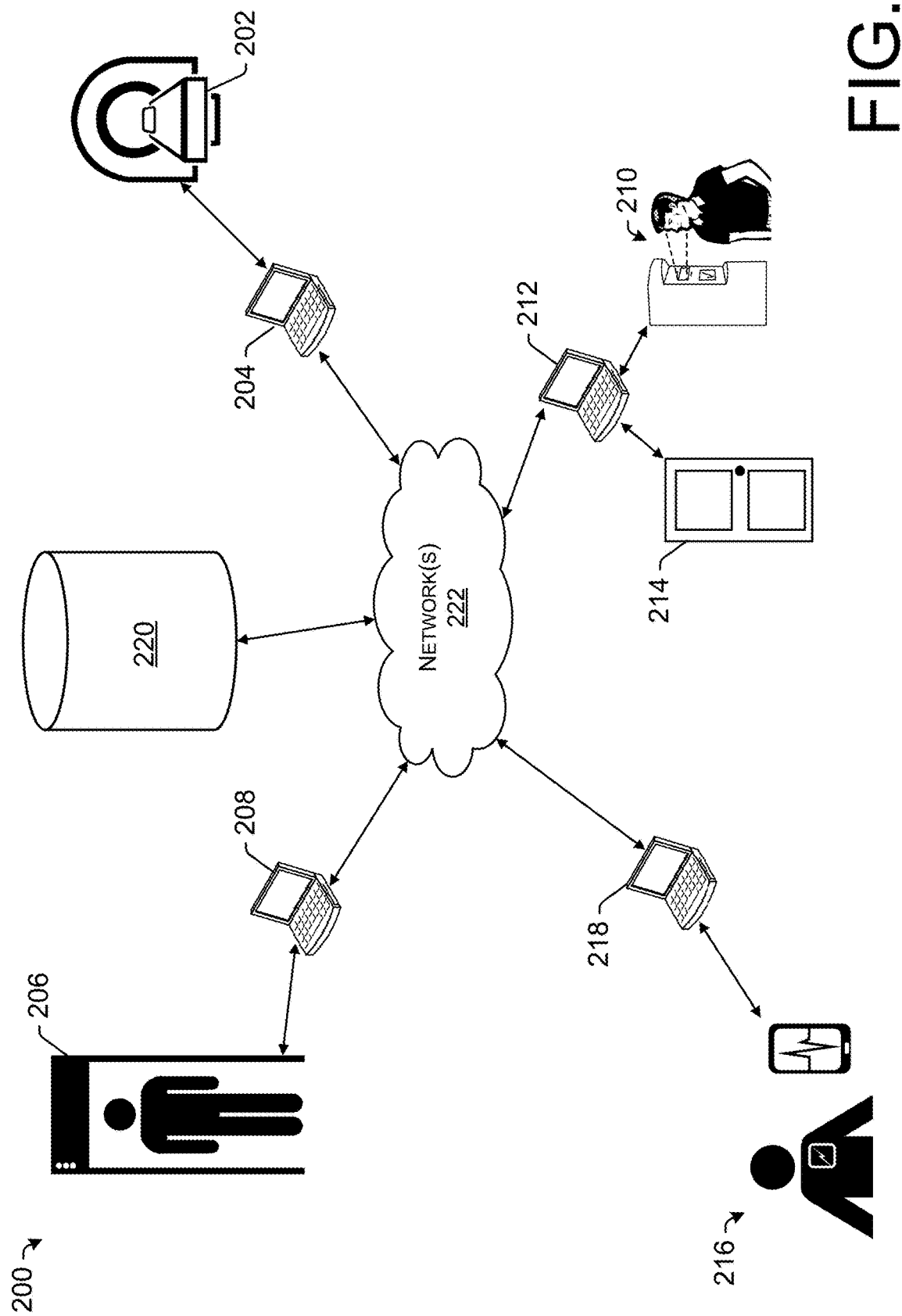
FIG. 2 illustrates various image capture modalities along with data collection and analysis systems for identification of individuals.

FIG. 2 shows another example environment for use of the disclosed systems and methods. FIG. 2 illustrates various data capture points and connections to database 220 via network 222. In one example, network 222 may be the internet. An MRI machine 202 at a medical provider site coupled to a computer 204 for collection of data describing soft tissue imaging is shown in FIG. 2. Other medical imaging equipment such as CT, x-ray, or ultrasound equipment may generate three-dimensional images for analysis and transmission and storage to databases 220.

A scanner 206 (such as a millimeter wavelength scanner) typically found in airport security areas is shown in FIG. 2. A scanner 206 can generate a three-dimensional image of a person's skin via computer 208 for analysis and transmission to database 220 via network 222. The three-dimensional image of a subject's skin may be used to identify that subject.

An iris scanner 210 connected to computer 212 is shown in FIG. 2. Iris scanner 210 collects an image of a person's iris for analysis and transmission to the database 220. Alternatively, or in addition, a person's retina may be scanned for analysis and transmission to the database 220. Once identity is authenticated, a person may be given access to a room 214.

A wearable device 216 can capture identifiable information associated with a user. The wearable device 216 can capture biometric information such as heart rate, heart electrophysiology, glucose monitoring, and $VO_2$max, although any type of data parameters can be captured. Example wearables 216 include smart watches, GPS watches, heart monitors, glucose monitors, heart rate monitors, and smart clothing monitors, among others. Each of these devices can measure one or more biometric markers such as heart rate, heart electrophysiology, glucose monitoring, and $V_{O_2}$max, which may be transmitted to database 220 via computing device 218. Example computer devices include computers, tablet computers, and smartphones.

Figure 3:
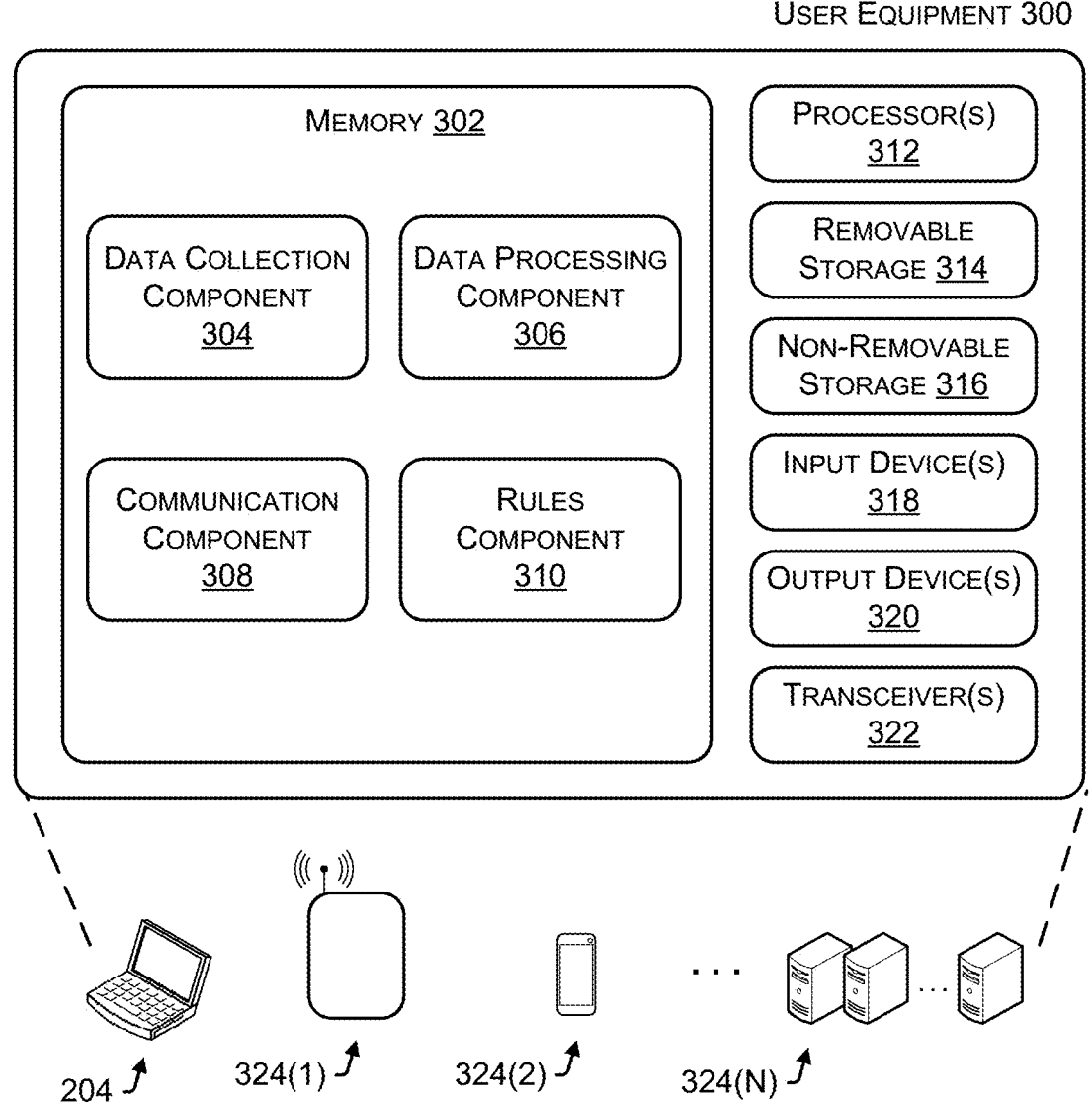
FIG. 3 illustrates an example computing device configured to implement the collection and analysis of datasets to identify a subject in accordance with embodiments of the disclosure.

FIG. 3 illustrates an example user equipment 300 configured to implement the collection, transfer, and processing of subject images through the computing device, in accordance with embodiments of the disclosure. In some embodiments, the user equipment 300 can correspond to the computer 204, 208, 212, and 216 of FIG. 2, a wireless smartphone 324(1), a tablet computer 324(2), or a server computer 324(N). It is to be understood in the context of this disclosure that the user equipment 300 is a computing device and can be implemented as a single device or as a plurality of devices with components and data distributed among them.

The user equipment 300 comprises a memory 302 storing a data collection component 304, a data processing component 306, a communication component 308, and a subject identity component rule(s) component 310. The user equipment 300 may also include processor(s) 312, a removable storage 314 and non-removable storage 316, input device(s) 318, output device(s) 320, and transceiver(s) 322.

In various embodiments, the memory 302 is volatile (such as RAM), non-volatile (such as ROM, flash memory, etc.) or some combination of the two. The data collection component 304, the data processing component 306, the communication component 308, and the rule(s) component 310 stored in the memory 302 can comprise methods, threads, processes, applications or any other sort of executable instructions. The data collection component 304, the data processing component 306, the communication component 308, and the rule(s) component 310 can also include files and databases.

The data collection component 304 may include functionality to control and sensor data from one or more sensors. In some examples, the sensor data may include image data such as data from an image sensor such as x-ray, MRI, CT, ultrasound, and millimeter wavelength image collection devices. In some examples, the sensor data may include functional data, for example data received from a wearable device such as wearable device 216. When implemented as an image collection device, the data collection component 304 can receive sensor data via wired or wireless communications. In some instances, sensor data to be received by the data collection component 304 can include, but is not limited to: image data, audio data (e.g., voice recognition), measured parameters such as heartrate or insulin levels, and the like. As may be appreciated, the number of sensors and the type of sensor data received by the data collection component 304 is virtually limitless. In some instances, the data collection component 304 can utilize any communication protocols, including but not limited to one or more of: Wi-Fi, 802.11-based protocols, cellular, Bluetooth, Bluetooth Low Energy, Zigbee, LoRa WAN, and the like.

The data processing component 306 may include functionality to receive sensor data received by the data collection component 304 and analyze the sensor data to determine the features to be transmitted to the database. In some instances, the data processing component 306 may identify features of the data collected based on expected features of the data collected, such as bone structure or arterial and venous structure. In other examples, the data processing component 306 may identify aberrant features such as morphological changes such as abnormal bone or tissue structure structures. Aberrant features may provide a signature for identification of a subject with high confidence. By way of example, the data processing component 306 can receive sensor data from an image collection apparatus indicative of the identification of a subject. Further, the data processing component 306 can determine features that are unique or at least highly correlated to a subject. In some instances, the data processing component 306 can include various rules (or can operate in conjunction with the rule(s) component 310) that, when satisfied, identify a subject with a high degree of confidence.

The communication component 308 can include functionality to transmit one or more features of collected data, as discussed herein. In some instances, the communication component 308 can transmit and receive data and other indications with the various communication components discussed herein. In some instances, the communication component 308 can include encryption and/or compression functionality to preserve a security of the components discussed herein, and to reduce an amount of data to be sent.

The communication component 308 may include functionality to access records stored in user equipment 300 (or in a database 220). For example, the communication component 308 can transmit collected data to the database 220 for storage with an associated key. The key may be used as an index to identify a record to be accessed in the database.

The rule(s) component 310 can include functionality to implement a rules-based approach to identify the subject of the data collection. In some instances, the rule(s) component 310 can present a user interface or otherwise allow one or more users to define rules or parameters indicating actions to be taken in response to preconditions. For example, the rule(s) component 310 can include rules regarding comparing the collected data with data from known subjects stored in the database. The rule(s) component 310 may also include rules regarding comparing the collected data against the entire database to determine the best match. Additionally, the rule(s) component 310 may allow a user to determine a confidence value or level associated with identifying the subject. The rule(s) component 310 can include rules regarding data types to be sent in connection the collected data (e.g., audio data, image data, and the like). The rules component may also include a machine learning component such as a neural network to predict expected changes in images over time to enhance the accuracy of the identification process.

In some embodiments, the processor(s) 312 is a central processing unit (CPU), a graphics processing unit (GPU), or both CPU and GPU, or other processing unit or component known in the art.

The user equipment 300 may also include additional data storage devices (removable and/or non-removable) such as, for example, magnetic disks, optical disks, or tape. Such additional storage is illustrated in FIG. 3 by removable storage 314 and non-removable storage 316. Tangible computer-readable media can include volatile and nonvolatile, removable and non-removable media implemented in any method or technology for storage of information, such as computer readable instructions, data structures, program modules, or other data. Memory 302, removable storage 314 and non-removable storage 316 are examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the user equipment 300. Any such tangible computer-readable media can be part of the user equipment 300.

The user equipment 300 also can include input device(s) 318, such as a keypad, a cursor control, a touch-sensitive display, voice input device, etc., and output device(s) 320 such as a display, speakers, printers, etc. These devices are well known in the art and need not be discussed at length here.

As illustrated in FIG. 3, the user equipment 300 also includes one or more wired or wireless transceiver(s) 322. For example, the transceiver(s) 322 can include a network interface card (NIC), a network adapter, a LAN adapter, or a physical, virtual, or logical address to connect to various network(s) 116 or 222, or to the user equipment 300, for example. To increase throughput for exchanging wireless data, the transceiver(s) 322 may utilize multiple-input/multiple-output (MIMO) technology or other high throughput wireless standards such as 802.11ac. The transceiver(s) 322 may comprise any type of wireless transceivers capable of engaging in wireless, radio frequency (RF) communication. The transceivers 322 can also include other wireless modems, such as a modem for engaging in Wi-Fi, 802.11-based protocols, WiMax, Bluetooth, near-field, or infrared communication.

Figure 4:
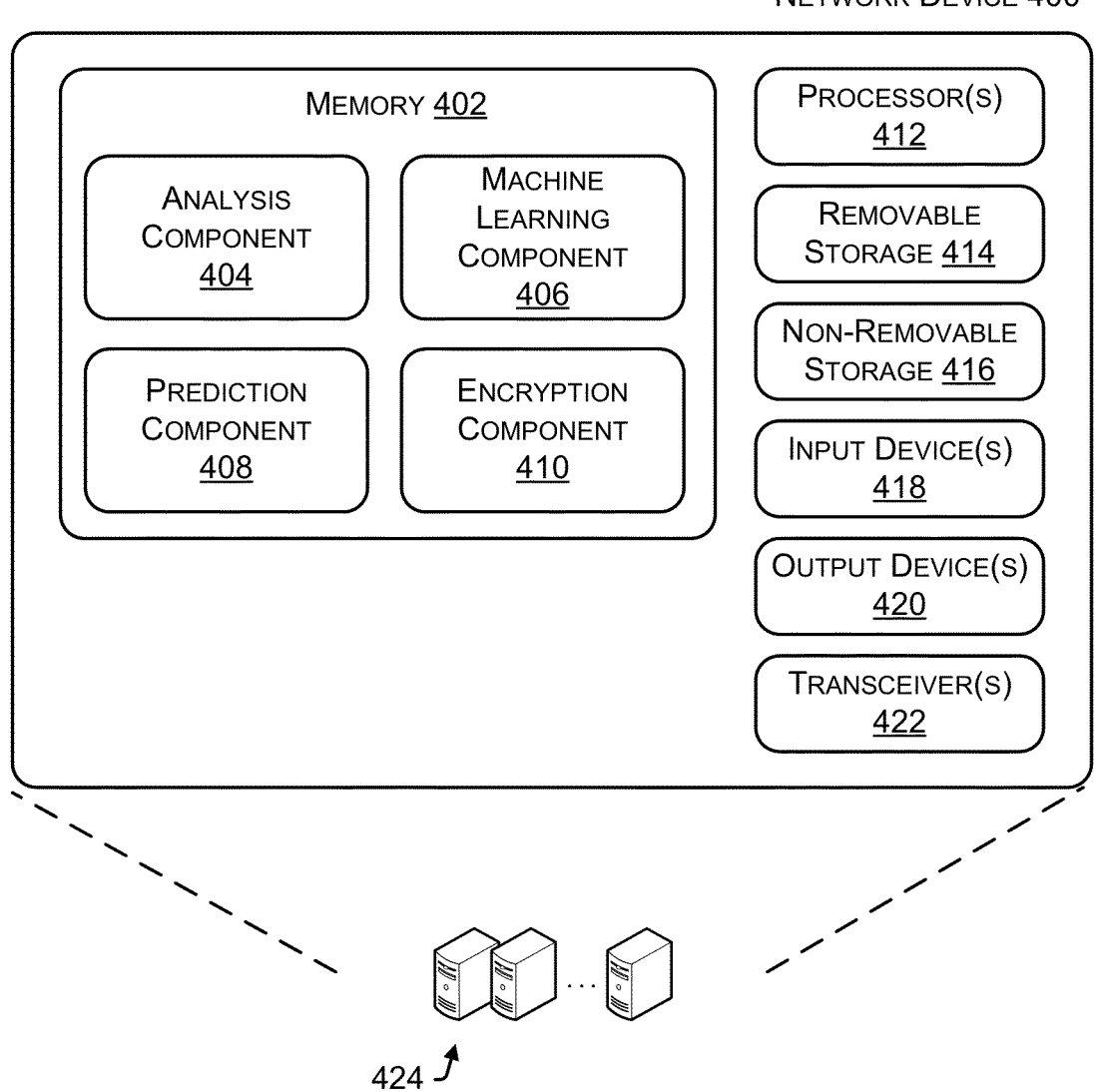
FIG. 4 illustrates an example user equipment configured to implement the remote analysis and identification of a subject through a computing device, in accordance with embodiments of the disclosure.

FIG. 4 illustrates an example network device 400 configured to implement the subject identification. In some embodiments, the network device 400 can correspond to the user equipment 300 of FIG. 3, or can operate in conjunction with the user equipment 300 to facilitate the subject identification, as discussed herein. For example, the network device 400 may be a server computer 424. It is to be understood in the context of this disclosure that the network device 400 can be implemented as a single device or as a plurality of devices with components and data distributed among them. By way of example, and without limitation, the network device 400 can be implemented as one or more smart phones, mobile phones, cell phones, tablet computers, portable computers, laptop computers, personal digital assistants (PDAs), electronic book devices, handheld gaming units, personal media player devices, wearable devices, or any other portable electronic devices that may generate voice and/or digital data, request voice and/or digital data over the network 116 or 222, receive voice and/or digital data over the network 116 or 222, and/or exchange voice and/or digital data over the network 116 or 222.

As illustrated, the network device 400 comprises a memory 402 storing an analysis component 404, a machine learning component 406, a prediction component 408, and an encryption component 410. The network device 400 also includes processor(s) 412, a removable storage 414 and non-removable storage 416, input device(s) 418, output device(s) 420, and transceiver(s) 422.

In various embodiments, the memory 402 is volatile (such as RAM), non-volatile (such as ROM, flash memory, etc.) or some combination of the two. The analysis component 404, the machine learning component 406, the prediction component 408, and the encryption component 410 stored in the memory 402 may comprise methods, threads, processes, applications or any other sort of executable instructions. The analysis component 404, the machine learning component 406, the prediction component 408, the encryption component 410 can also include files and databases.

The analysis component 404 analyzes and identifies the received data against data stored in the database. The analysis component 404 can include functionality to receive one or more data sets associated with a subject. The datasets may be received from a user equipment 300 or from the database 220. It is understood that datasets may encompass any type of data related to a subject. Datasets may include an image of a subject such as an x-ray, CT, MRI, millimeter wavelength images, among others, and parameter data of a subject such as heart rate, metabolic measurements, glucose level or other biochemical, physiologic, or metabolic parameters.

In one example, the database 220 is a relational database that may be accessed using a key. The key may be used as an index into the database to access a database record. The key may be provided by user equipment 300 or generated by network device 400. In another example, a distributed database 220 may be based on blockchain technology for database accessing, including reading and writing across the distributed blockchain. The analysis component 404 can send and receive image data and other indications or datasets of a subject with the various communication components discussed herein. In some instances, the analysis component 404 interfaces with encryption component 410 to preserve security of the components or data as discussed herein, and to reduce an amount of data to be sent.

The analysis component 404 may interact with the machine learning component 406 to further enhance the robustness of the identification performed by the systems and methods. The machine learning component 406 can include functionality to analyze images or other data stored in the database. In one example, the machine learning component 406 comprises a deep neural network for predicting image changes in data associated with a subject or for identifying the subject images. Disease states of a subject may produce morphological, physiological, biochemical, or metabolic changes over time that may be estimated by the machine learning component. In other examples, the healing process of fractures may be estimated by machine learning component 406. As discussed below, the machine learning component may estimate these expected changes to facilitate subject identification.

The machine learning component 406 may include a wide variety of neural network and statistical analyzers. A neural network may include parameter weights that may be trained (or adjusted) to identify features in data using a corpus of training data. In one example, the training data comprises a statistical representation of the expected data so that the neural network may identify datasets with a high degree of confidence. The machine learning component 406 may be trained using a supervised learning algorithm. In one example, the corpus of training data includes labels for identifying the datasets. As used herein, the term datasets include any data captured for subject identification, including images and parameter data discussed previously. During training, the weight parameter associated with the nodes in the neural network are adjusted based on the deviation from the output of the neural network and the known classifications of the corpus training data. The neural network may also be trained using an unsupervised learning algorithm such as a self-organizing map to identify features in the corpus training data. Upon training, the neural network of machine learning component 406 may classify datasets it receives from user equipment 300.

The prediction component 408 may predict changes in the datasets based upon expected morphological, metabolic, or other changes in the data. For example, a broken bone may repair itself over time, and the prediction component 408 may model those expected changes. In other examples, cancers, autoimmune disorders, and other disease states may produce known changes that may be collected over time as images or data acquisition. The prediction component 408 may also predict blood pressure and other cardiovascular change over time. Other predictions may include morbidity and/or morphological changes stemming from malignant or benign tumor or other abnormal cellular growth or division. The prediction component 408 may also predict changes due to normal aging such as decreased muscle or bone mass that occurs as people age. For example, the prediction component 408 may analyze and account for changes produced by osteoporosis, osteoarthritis, as well as autoimmune diseases. The prediction component 408 provides a robust level of identification of an unknown subject in the presence of expected underlying changes manifested in the collected data.

As discussed previously, the privacy of the data collected for a subject should be maintained to prevent inadvertent disclosure and nefarious use of the data. One way of enhancing the privacy of the data is the use of an encryption component 410. This encryption component provides the necessary encryption of data at points in the analysis chain. For example, this component may encrypt the datasets for storage in the database 200. In other examples, the database 220 may include an encryption component for performing the encryption operation. The encryption component may also encrypt data when it is stored and operating on by a processor. For example, during transfer to the database, the encryption component 410 may encrypt datasets collected by an image collecting apparatus. It is understood that an image collection apparatus includes any device that collects images and parameter data of an individual. In other examples, encryption component 410 may encrypt datasets after the data is accessed from the database. Encryption component 410 may also encrypt datasets during transmission to, from, and within the analysis component 404.

In some embodiments, the processor(s) 412 is a central processing unit (CPU), a graphics processing unit (GPU), or both CPU and GPU, or other processing unit or component known in the art.

The network device 400 also includes additional data storage devices (removable and/or non-removable) such as, for example, magnetic disks, optical disks, or tape. Such additional storage is illustrated in FIG. 4 by removable storage 414 and non-removable storage 416. Tangible computer-readable media can include volatile and nonvolatile, removable and non-removable media implemented in any method or technology for storage of information, such as computer readable instructions, data structures, program modules, or other data. Memory 402, removable storage 414 and non-removable storage 416 are examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by the network device 400. Any such tangible computer-readable media can be part of the network device 400.

The network device 400 can include input device(s) 418, such as a keypad, a cursor control, a touch-sensitive display, etc. Also, the network device 400 can include output device(s) 420, such as a display, speakers, etc. These devices are well known in the art and need not be discussed at length here.

As illustrated in FIG. 4, the network device 400 can include one or more wired or wireless transceiver(s) 422. In some wireless embodiments, to increase throughput, the transceiver(s) 422 can utilize multiple-input/multiple-output (MIMO) technology, 801.11ac, or other high bandwidth wireless protocols. The transceiver(s) 422 can be any sort of wireless transceivers capable of engaging in wireless, radio frequency (RF) communication. The transceiver(s) 422 can also include other wireless modems, such as a modem for engaging in Wi-Fi, WiMax, Bluetooth, or infrared communication.

Figure 5:
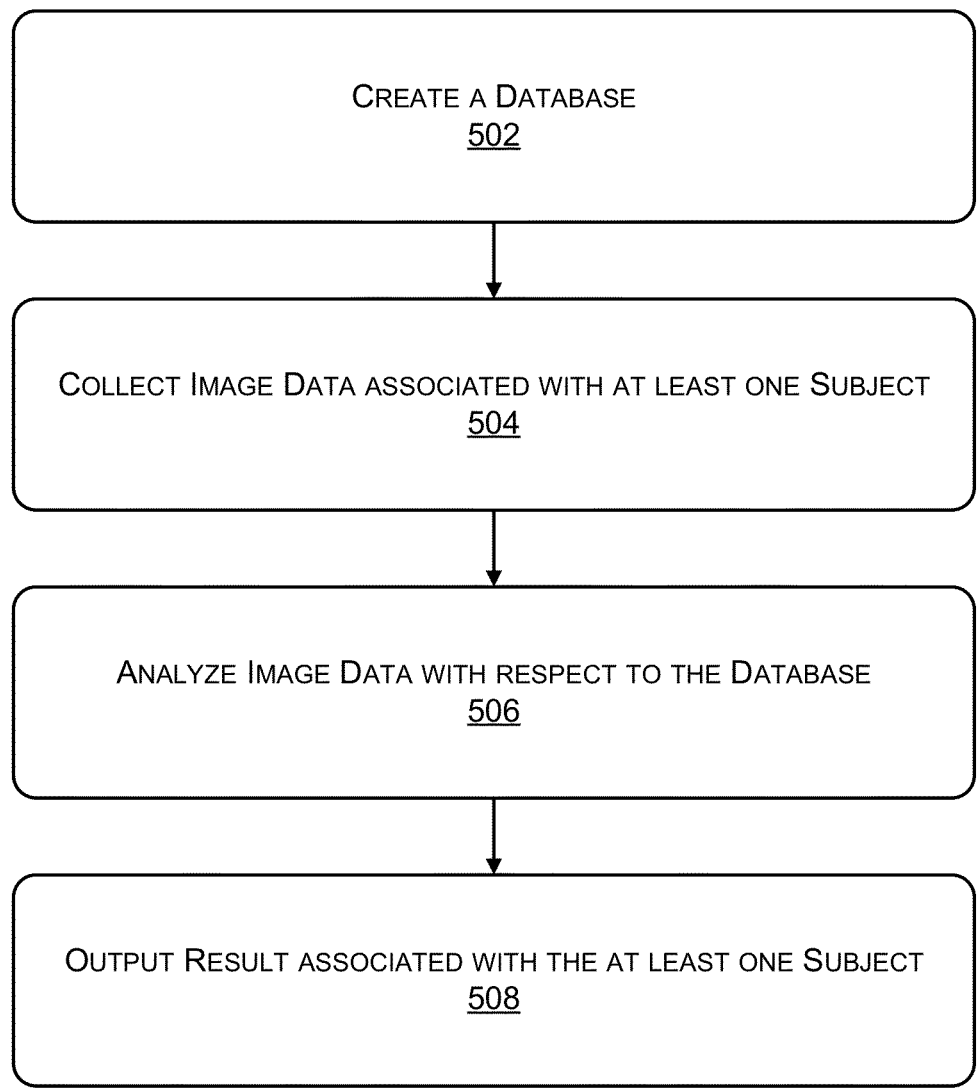
FIG. 5 is a flow diagram illustrating a method of image collection and individual identification, in accordance with embodiments of the disclosure.
Figure 6:
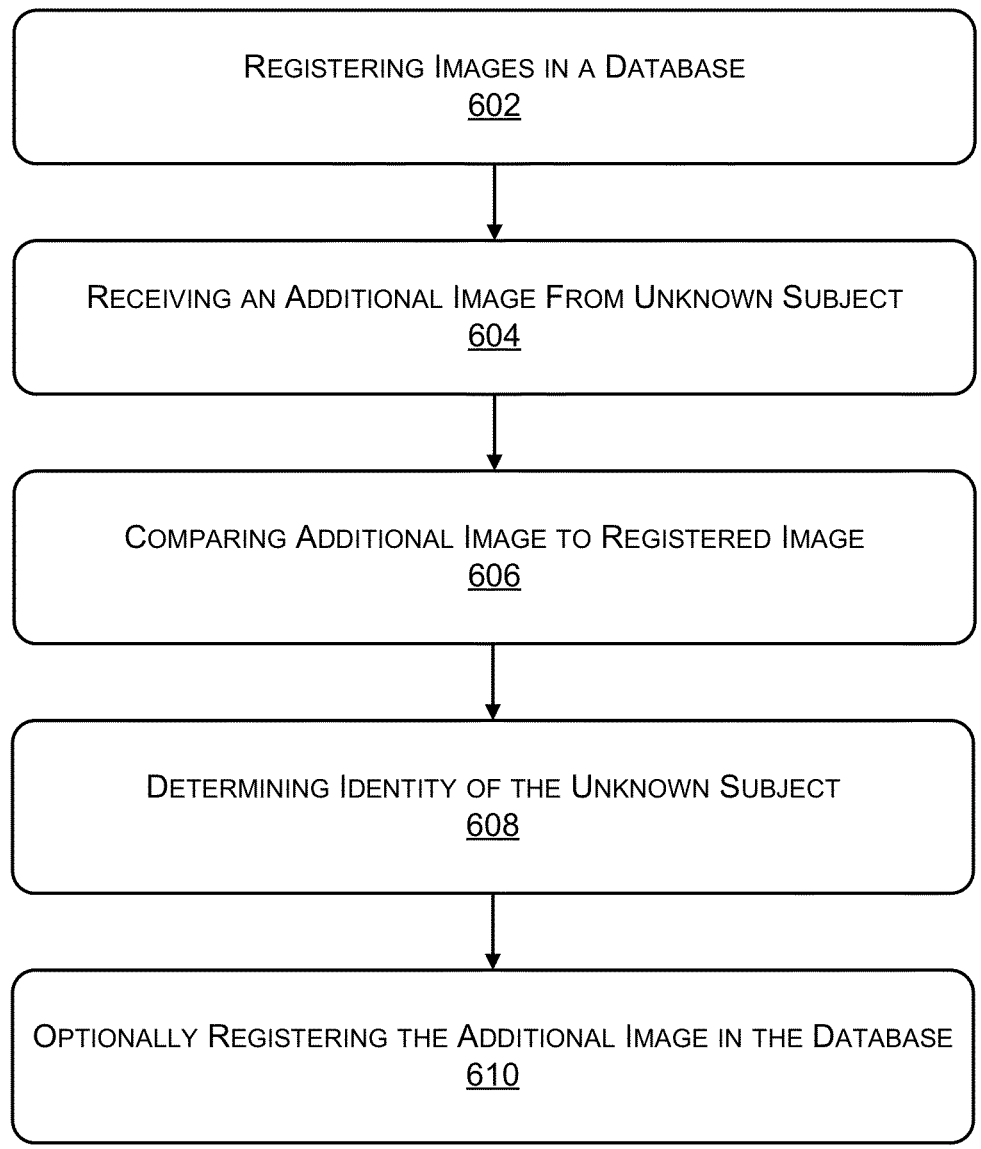
FIG. 6 is a flow diagram illustrating a method of image collection and individual identification in accordance with embodiments of the disclosure.

FIGS. 5-7 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 5 shows an example method 500 for human identification. A universal database is shown at operation 502 is created. This database includes biometric data that is indexed by the individual whose data is stored in the database. Biometric data may include structural or feature data of an individual, electrophysiological, metabolic, biochemical, or physiological data. This database stores three-dimensional image data and other biometric data, along with a unique key for associating the biometric datasets to a subject. The unique key may be used to accessed specific records in the database. The database may store images of a subject's bone structure, arterial and/or venous structure, ear structure, eye structure such as retina or iris scans. The database may also store metabolic, physiologic, or other markers or properties of a subject. Example markers may include conventional blood tests, insulin tests, cholesterol tests, electrocardiogram results, electroencephalogram measurements, and other diagnostic or physiological tests. for unique identification of people. The database may be accessed by various computing devices before, during, or after image collection. Additionally, the database may be accessed by other computing devices for individual identity confirmation.

In one example, the database created in the operation 502 may be a centralized database. In another example, the database may be a distributed database. One example of a distributed database is a database based on blockchain technology. In addition to providing a distributed database, blockchain technology may allow for secure transfer and storage of the collected data. As discussed previously, security of this individual data may be important, both from an individual perspective and from a governmental regulatory perspective.

During operation of an example method, datasets such as image data are collected for least one subject at operation 504. During this operation, biometric data, such as three-dimensional images or other biometric data generated from wearable devices, may collected by the user equipment 300. This data may be collected at sites or by the various devices shown in FIGS. 1-3, as well as other sites for data collection. The data collection operation may include a security function to ensure the privacy of data during and after collection.

Following image capture, the image may be converted to a flat file. In one example, the flat file includes raw data records without structure or markup language syntax. The flat file may include a text file without structure characters or markups. The flat file may include an image file without any structure. Certain aspects of the flat file may be identified during the comparison process. These aspects may include expected features of an image. Flat file features may also include anomalies that are correlate to morbidity, morphological, biochemical, metabolic, or other changes. These anomalies may serve as signatures to enhance the predictability of the system and methods. Flat file features may also include expected features of the collected datasets. In one example, the flat file may include the signature features identified with an image.

In other examples, the image may be transferred to the database 220 as a structured file. Structured files may include xml files, HTML files, or other files including markup language code. The files may also be compressed and/or processed to reduce noise or enhance the features of the data before analysis.

After the data is collected in the operation 504, collected datasets may be analyzed against data stored in database 220 at operation 506. The analysis may be performed locally by the user equipment 300, remotely by the network device 400, or partially locally by user equipment 300 and partially remotely by network device 400. For example, the computer associated with the imaging equipment or biometric monitoring equipment (e.g., 204, 208, 212, 326 shown in FIG. 2) may analyze the collected information and perform the identification operation locally. In this case, the local computer identifies the salient features of the collected image or biometric data.

At operation 508, the collected image, and if applicable, the predicted modifications to the image are analyzed. In one example, the collected images or biometric data are compared to the images and biometric data stored in the database. A sufficient match to data stored in the database, based upon an acceptable tolerance between the collected images (or biometric data) and the images (or biometric data) stored in the database, is performed in operation 506. In one example, the match may be performed, at least in part, by a search operation.

A sufficient match may be identified based on various factors. Matches may be identified based in part on expected features of a collected image or biometric data. In one example, a unique bone structure or a unique arterial and venous structure, or a combination thereof, is identified. This unique structure is matched against datasets in the database. If a match is found, the subject under test may be uniquely identified. Alternatively, an anomalous structure or other structures not expected may be used for searching in the database. This anomalous structure may uniquely identify the person under test.

These salient features for identification may include data representative of the high information content of the images. Example high information content data may include data describing the expected three-dimensional image or biometric data. Other high information content data may include anomalous data describing unexpected or unique features of the collected image compared to the expected image. It is understood that in some examples, the high information content data may be dependent on the data collected. Representing the collected images as expected and/or anomalous data may provide an efficient way to compress the images and retain the high information content data in the database 220.

The image data or biometric data may be analyzed remotely by network device 400. In this case, the collected image data may securely transmitted to the database 220. The secure transmission may include an encryption process to prevent or reduce the unauthorized access of the data. The network device 400 may access the datasets stored in the database to perform the analysis. One example of a remote computer is a network node coupled to a computer locally connected to the imaging apparatus. Alternatively, the data may be transmitted directly to the network device 400 in addition to being stored on the database 220.

In one example, the collected data may be timestamped and compared to datasets stored in the database 220 as part of the analysis operation 506. The datasets stored in database 220 may include datasets or images acquired using the same image collection or biometric data collection. This analysis may account for expected changes in the datasets over time, which may facilitate the identification. For example, certain morphological features in a subject may be expected to change over time such as a bone. In this case, a fracture or broken bone detected in either the newly collected image or a recently collected image may be expected to change during the healing process. Upon accounting for changes manifested in expected healing of the bone at operation 506, a more robust identification process may result. Alternatively, an x-ray image or other dataset that includes an anomaly that is expected to remain for a certain amount of time (such as a screw, pin, rod, or other artificial part), may be flagged for future confirmation of that individual's identity.

Other examples of accounting for changes in the body's three-dimensional structure or other biometric data over time include imaging soft tissue damage such as torn or stretched muscles, tendons, or ligaments. Additionally, tumors (either benign or cancerous) may quickly change morphology over time. These changes may be considered when performing human identification. Similarly, retinal scans may indicate morphological changes such as macular degeneration or iris scans may indicate the presence of cataracts. Each of these changes may be used to facilitate the identification process at operation 508.

This modification or prediction of morphological or temporal changes may be performed on the collected image or biometric data, on the data that is stored in the database, or on both collected and stored data. This modification or prediction may be performed by a local computer or a remote computer that can access the database through a network connection. In other examples, no modifications or predictions are made from the collected data.

One method of predicting morphological or temporal changes is the use of deep learning neural networks. Using this approach, the deep neural network is trained using a large cohort of known images. By training the neural network using a statistically representative sample, the network be configured to predict image changes over time. Accordingly, once trained, a neural network can predict changes in an image over a specified period of time.

At operation 508, the result of the analysis can be output from the system. The system output may generate the identification of the subject. At this point, the unique identity of person or sample under test is confirmed and output from the system. In another example, the system many not identify a subject, and this result may be outputted at operation 508.

FIG. 6 depicts a flow diagram of a method 600 illustrating another example of identifying a subject of an image. At operation 602, images may be registered as registered images in a library of images in the database 220. It is understood that images or parameters registered as registered images may be collected by the same or different image collection apparatuses. A registered image may be accessed or addressable in a database. Each registered image can be collected by an image collection apparatus at a point in timed. Each registered image may be indicative of a first morphology of a subject. For example, a registered image may indicate a structure of a known subject (such as bone, arterial, or venous structure), an electrophysiological parameter of a subject (such as heart rate, electrocardiogram, magnetoencephalogram), a biochemical or physiological parameter (such as glucose level), and metabolic parameters (such as VO2 max). The database may include images collected from various sites, as discussed previously, including airport security, governmental agencies, medical providers, daycare centers, border crossings, secure rooms. Example imaging collecting apparatuses include a millimeter wavelength apparatus, a magnetic resonance imaging apparatus, a computed tomography apparatus, an ultrasound apparatus, an iris scanner, or a retina scanner, as well as parameter measured by wearable devices or laboratory tests ordered or provided by medical providers.

Upon creation of the database, an image collection apparatus may collect an image of an unknown subject at a point in time at operation 604. It is understood that images or parameters may be collected by the same or different image collection apparatuses. The collected additional image indicates a morphology of the unknown subject. Example morphological indications include images and other datasets relating to structure, metabolic, biochemical, electrophysiological, or physiological parameters of a subject. For example, the morphology may indicate a two-dimensional image, a three-dimensional image, a four-dimensional image, a metabolic function, a bone structure, an artery structure, a venous structure, an ear structure, an eye socket structure, a retina structure, an iris structure, a hard tissue, or a soft tissue. The collected additional image may be received by a user equipment 300 or network device 400 for identification.

At operation 606, the received additional image is analyzed for identification. The additional image may be compared against datasets such as images or other parameters stored in a library of images in the database 220 to generate a comparison. Operation 606 may optionally include a function for predicting time-elapsed changes to images or parameters as discussed previously. The comparison may be based at least in part on comparing the morphological or other parameters (e.g., electrophysiological, physiological, metabolic, or biochemical) of the additionally collected images and the images stored in the database 220. In some examples, the morphology may be indicative of at least one of a metabolic function, a bone structure, an artery structure, a venous structure, an ear structure, an eye socket structure, a retina structure, an iris structure, a hard tissue, or a soft tissue.

The comparison generated during operation 606 may include a confidence metric indicating the strength of the comparison. For example, the systems and methods may generate a statistical summary of the error between the additional image and the images in the database. This error may indicate the confidence of the accuracy of the comparison. The confidence metric may be used to filter false positives or negative identifications.

At operation 608, the identity of the unknown subject is determined based in part on the comparison of the additional image to images stored in the database 220.

At operation 608, the additional image may be registered in the database 220. It is understood that the additional imaged may be registered in the database at any time after it is collected by an imaging collection apparatus. For example, the additional image may be registered at any point in the process shown in FIG. 6 after operation 604.

The determining operation at operation 608 may include analyzing a confidence metric that may have been generated at operation 606. This confidence metric may be used to determine the level of confidence of the identification of the subject. In one example, the identification of the subject may be provided along with a confidence interval relating to the statistical accuracy of the identification.

The flow diagram in FIG. 6 may also include encryption steps to alleviate data privacy concerns. For example, the images or parameters may be encrypted after encryption. In other examples, the datasets stored associated with unknown subjects or known subjects may be encrypted during the comparison and identification operations.

Example Use Cases

Airport security typically uses a low-dose x-ray beams or millimeter wavelength radiation to create an outline profile of individuals for security purposes. Besides the outline profile, these imaging modalities may produce image signatures that may be used for identification purposes. Example imaging signatures include three-dimensional skeletal structure or three-dimensional skin profile. The unique signatures generated may be analyzed along with labeled signatures from a universal database to uniquely identify individuals at airport security checkpoints. This approach may be used to create images or signatures for identification of individuals at gate or border crossing. Identification of people at gate, border, airport security checkpoints and shipping ports may facilitate the detainment of specific people or known threats or to prevent specific people from accessing or entering certain highly secure places.

Other imaging technologies may generate signatures for identification purposes. MRI technologies can generate high resolution three-dimensional images of soft and hard tissue, as well as blood flow. CT images also generate high resolution three-dimensional images hard tissue, and under certain conditions, soft tissue. The recently generated MRI or CT images may be used to uniquely identify individuals for limited access to certain locations. For example, MRI or CT images may be used to authorize access to only specific individuals to highly secure projects areas. This secure authorization by determining an individual's identity through a comparison of tissue density and organ structure ensures highly accurate authorization or entry into secure facilities. MRI or CT scan verification used, for example, for long-term projects such as for travel to a bio-dome, extremely sensitive projects (on a need to verify basis). MRI or CT scan verification technology may be applied to circumstances requiring a high degree of accuracy.

In one example, an individual's three-dimensional structural signatures may be generated using x-rays, MRI, CT, and/or ultrasound scans. Scans of an individual may be generated during contact with the medical ecosystem, including visits to physicians, laboratories, urgent care clinics, and emergency rooms. Images may also be generated during contacts by an individual outside the medical ecosystem, such as at airports, border crossings, and government agencies. These scans may be stored as digitized images in a universal database. Through this fashion, a universal database of images is collected for use in the future for identification purposes.

After the universal database is created containing signatures of individuals, image capture of individuals may occur at border crossings or other secure checkpoints. Three-dimensional images unique to an individual may be generated using three-dimensional x-ray or millimeter wave radiation (similar to airports). This collected image may be compared against a stored image in the universal database to uniquely identify an individual.

In another example, three-dimensional MRI or CT images of an individual's tissue density or organ structure may be generated. In an example images or scans of a person's arterial or venous structure, ear structure, eye structure, iris, or retina may be obtained. Each of the images or scans may be used as a signature to compare against known images stored in a universal database. A match of the collected images against the known images in the database stored during registration may uniquely identify an individual.

If a collected image matches images in the database, the individual may be uniquely identified and granted access to a secure location. Alternatively, an individual that fails authentication and identification may be denied authorization to services/entry to certain secure places.

In some examples, the collected images or signatures may be compared against the universal database for unique identification of an unknown person. Authorization or access may be made based on the identification of the user. In other examples, the collected images or signatures may be compared against a subset of authorized users to determine if the person under test is a member of the identified subset or group. Authorization or access may be made based on the determination of whether the individual is a member of the selected group.

In other examples, individuals may have unique metabolic, cardiac, electroencephalographic, or other functions that change over time. Images based upon these four-dimensional images may be generated and used as signatures to uniquely identify a person. The disclosed methods and systems may be applied to any two-, three-, or four-dimensional images associated with an individual.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
   registering, as a registered image in a library of registered images in a database, at least one image associated with a subject, the at least one image collected by a first image collection apparatus at a first time and indicative of a first morphology of the subject;
   receiving an additional image associated with an unknown subject having an identity, the additional image collected by a second image collection apparatus at a second time and indicative of a second morphology of the unknown subject;
   identifying, from the second morphology indicated by the additional image, a morphological anomaly associated with the unknown subject;
   generating, based, at least in part on an elapsed time between the first time and the second time, an expected change in the first morphology indicated by the registered image, wherein generating the expected change is performed by a neural network having an input, an output, and a set of weights, the input of the neural network receiving at least one of the registered images at a third time or an additional image at a fourth time, the output of the neural network indicative of the expected change;
   comparing the additional image to the at least one image of the registered images to generate a comparison of at least the first morphology and the second morphology based at least in part on comparing the expected change in the first morphology with the second morphology;
   determining, based at least in part on the comparison, whether the first morphology includes the morphological anomaly associated with the unknown subject; and
   determining, based at least in part on the comparison, the identity of the unknown subject.

2. The method of claim 1, further comprising:
   registering, as the registered image in the library of images in the database, the additional image associated with the identity of the unknown subject.

3. The method of claim 1, wherein the first morphology or the second morphology is indicative of at least one of a bone structure, an ear structure, an eye socket structure, a retina structure, or an iris structure.

4. The method of claim 1, wherein the first image collection apparatus or the second image collection apparatus comprises at least one of a millimeter wavelength apparatus, a magnetic resonance imaging apparatus, a computed tomography apparatus, an ultrasound apparatus, an iris scanner, or a retina scanner.

5. The method of claim 1, wherein comparing the additional image further comprises:
   accessing, as an accessed image, an additional registered image from an additional database of registered images associated with known subjects; and
   comparing the accessed image with at least one of the additional image or the registered image to generate a confidence metric.

6. The method of claim 1, further comprising:
   encrypting the registered image; and
   encrypting the additional image.

7. A system comprising:
   one or more processors;
   a memory; and
   one or more components stored in the memory and executable by the one or more processors to perform operations comprising:
      receiving, as a received image, an image of a subject captured by a first imaging apparatus at a first time, the image indicative of a first morphology of the subject, the subject having an identity;
      accessing a registered image in a library of registered images stored in a database coupled to a network, wherein the registered image in the library of registered images is captured by a second imaging apparatus at a second time, is associated with a known subject, and is indicative of a second morphology of the known subject;
      identifying, from the registered image, a morphological anomaly indicated by the second morphology;
      generating, based, at least in part on an elapsed time between the first time and the second time, an expected change in the first morphology indicated by the received image, wherein generating the expected change is performed by a neural network having an input, an output, and a set of weights, the input of the neural network receiving at least one of the registered images at a third time or an additional image at a fourth time, the output of the neural network indicative of the expected change;
      comparing the first morphology with the second morphology to generate a comparison based at least in part on comparing the expected change in the first morphology with the second morphology;
      determining, based at least in part on the comparison, whether the morphological anomaly is indicated by the first morphology; and
      determining, based at least in part on the comparison, the identity of the subject of the received image.

8. The system of claim 7, wherein the operations further comprise transmitting the registered image of the known subject to the database.

9. The system of claim 7, wherein the comparing further includes:
   evaluating a predicted second morphology based at least on the first morphology and the expected change in the first morphology; and
   comparing the predicted second morphology to the second morphology to generate a difference between the registered image and the received image.

10. The system of claim 7, wherein the comparing further includes:
  predicting, an expected change in the second morphology, based on the first time;
  evaluating a predicted first morphology based at least on the second morphology and the expected change in the second morphology; and
  comparing the predicted first morphology to the first morphology to generate a difference between the registered image and the received image.

11. The system of claim 9, wherein the neural network is configured by applying a training data set to the input of the neural network and adjusting the set of weights until the output of the neural network meets an acceptable threshold.

12. The system of claim 7, wherein the comparing further includes:
  determining that a difference between the registered image and the received image exceeds a threshold difference.

13. The system of claim 7, wherein the operations further comprise:
  encrypting the registered image; and
  encrypting the received image.

14. The system of claim 7, wherein the subject represents at least one of a person, an animal, a plant, an article of manufacture, or a process of manufacturing.

15. The system of claim 7, wherein the first imaging apparatus or the second imaging apparatus includes at least one of: an iris scanner or a retina scanner.

16. The system of claim 7, wherein the first morphology or the second morphology includes at least one of a two-dimensional image, a three-dimensional image, a four-dimensional image, a metabolic function, a bone structure, an artery structure, a venous structure, an ear structure, an eye socket structure, a retina structure, an iris structure, a hard tissue, or a soft tissue.

17. The system of claim 7, wherein the first imaging apparatus is located at a security checkpoint, an airport, a government agency, or a health care provider.

18. The system of claim 7, wherein the identity is a first identity, and wherein the operations further comprise:
  receiving an additional image associated with an unknown subject having a second identity, the additional image collected by the second imaging apparatus at the second time and indicative of the second morphology of the subject;
  creating a flat file from the additional image; and
  registering the flat file of the additional image in the library of registered images, the flat file of the additional image associated with the second identity of the unknown subject.

19. A non-transitory computer-readable storage medium having computer-executable instructions stored thereupon which, when executed by one or more processors, cause the processors to:
  receive, as a received image, an image of a subject captured by a first imaging apparatus at a first time, the image indicative of a first morphology of the subject, the subject having an identity;
  access a registered image in a library of registered images stored in a database coupled to a network, wherein each of the registered images in the library are captured by a second imaging apparatus at a second time, are associated with a known subject, and are indicative of a second morphology of the known subject;
  generating, based, at least in part on an elapsed time between the first time and the second time, an expected change in the first morphology indicated by the received image, wherein generating the expected change is performed by a neural network having an input, an output, and a set of weights, the input of the neural network receiving at least one of the registered images at a third time or an additional image at a fourth time, the output of the neural network indicative of the expected change;
  compare the first morphology with the second morphology to generate a comparison based at least in part on comparing the expected change in the first morphology with the second morphology; and
  determine, based at least in part on the comparison, the identity of the subject of the received image.

20. The non-transitory computer-readable storage medium of claim 19, wherein at least one of the first imaging apparatus or the second imaging apparatus includes at least one of a millimeter wavelength apparatus, a magnetic resonance imaging apparatus, or a computed tomography apparatus.

21. The non-transitory computer-readable storage medium of claim 19, wherein at least one of the first morphology or the second morphology is indicative of at least one of a metabolic function, an artery structure, a venous structure, or a hard tissue.

* * * * *